United States Patent
Carr et al.

(10) Patent No.: US 7,519,972 B2
(45) Date of Patent: Apr. 14, 2009

(54) REAL-TIME MULTI-MODAL BUSINESS TRANSFORMATION INTERACTION

(75) Inventors: Derek W. Carr, Fairless Hills, PA (US); Peter P. Eacmen, West Roxbury, MA (US); Ronny A. Pena, New York, NY (US); Ajamu A. Wesley, Concord, MA (US)

(73) Assignee: International Business Machines Corporation, Armonk, NY (US)

( * ) Notice: Subject to any disclaimer, the term of this patent is extended or adjusted under 35 U.S.C. 154(b) by 858 days.

(21) Appl. No.: 10/885,263

(22) Filed: Jul. 6, 2004

(65) Prior Publication Data

US 2006/0020948 A1    Jan. 26, 2006

(51) Int. Cl.
   *G06F 9/44*    (2006.01)
(52) U.S. Cl. ...................................... 719/318; 719/311
(58) Field of Classification Search ................ 719/318, 719/310, 311, 320, 328; 718/100, 101
   See application file for complete search history.

(56) References Cited

U.S. PATENT DOCUMENTS

| | | | |
|---|---|---|---|
| 6,493,714 B1 | 12/2002 | Beaven et al. | |
| 7,100,195 B1* | 8/2006 | Underwood | 726/2 |
| 7,330,826 B1* | 2/2008 | Porat et al. | 705/26 |
| 2001/0047279 A1 | 11/2001 | Gargone et al. | |
| 2001/0056504 A1 | 12/2001 | Kuznetsov | |
| 2002/0107864 A1 | 8/2002 | Battas et al. | |
| 2002/0112182 A1 | 8/2002 | Chang et al. | |
| 2002/0174126 A1* | 11/2002 | Britton et al. | 707/100 |
| 2003/0050936 A1* | 3/2003 | Wainwright | 707/104.1 |
| 2003/0133552 A1* | 7/2003 | Pillai et al. | 379/114.2 |

OTHER PUBLICATIONS

Lentini, Russel et Al. EMAA: An Extendable Mobile Agent Architecture. American Association for Artificial Intelligence. 1997. pp. 1-7. Internet site: http://www.atl.external.lmco.com/overview/papers/930-9823.pdf.*

Quddor Chong, et. al., Transactional Modeling and Execution of Web Service Workflows on the Semantic Web, Copyright 2003, Thesis (U. Missouri—KC 2003).

Holt Adams, Engagement Manager and Solutions Architect, IBM jStart, IBM developer Works (Oct. 2002).

H. Maruyama, New Trends in E-Business: From B2B to Web Services, New Generation Computing, vol. 20, No. 1, pp. 121-125 (Ohmsha Ltd).

(Continued)

*Primary Examiner*—Van H Nguyen
(74) *Attorney, Agent, or Firm*—Gerald R. Woods, Esq.; Steven M. Greenberg, Esq.; Carey Rodriguez Greenberg & Paul LLP (57) ABSTRACT

A method for real-time multi-modal interaction in a cross-enterprise business process management system includes the steps of handling an event in a business process specification document processing engine and forwarding the event through a gateway interface to a real-time interaction client. A responsive instruction is received from the real-time interaction client through the gateway interface. In consequence, the execution of a business process transformation script is triggered based upon the responsive instruction.

13 Claims, 5 Drawing Sheets

OTHER PUBLICATIONS

Sengupta, et, el., Switched Optical Backbone for Cost Effective Scalable Core IP Networks, IEEE Communications Magazine, vol. 41, No. 6, pp. 60-70, Copyright 2003.

Oliveira, et. al., Agents' Advanced Features for Negotiation in Electronic Commerce and Virtual Organisations Formation Process, Agent Mediated Electronic Commerce. European agentlink persepective (Lecture Notes in Artificial Intelligence vol. 1991, pp. 78-97, Copyright 2001.

Rocha, et. al., Adaptive Multi-Issue Negotiation Protocol for Electronic Commerce. Copyright 2000.

Venkatraman, IT-Enabled Business Transformation: From Automation to Business Scope Redifinition, Sloan Management Review, vol. 35, No. 2, pp. 73-87, Copyright 1994.

Okonski, et. al., Enterprise Transforming Initiatives, IEEE Power and Energy Magazine, vol. 1, No. 3, pp. 32-35, Copyright 2003.

Winter, et. al., the Role of IT in the Transformation of Work: a Comparison of Post-Industrial, Industrial, and Proto Inductrial Organization, Information Systems Research, vol. 7, No. 1, pp 5-21, Copyright 1996.

* cited by examiner

REAL-TIME MULTI-MODAL BUSINESS TRANSFORMATION INTERACTION

BACKGROUND OF THE INVENTION

1. Statement of the Technical Field

The present invention relates to the field of computerized business-to-business interactions and more particularly to integrating cross enterprise business processes.

2. Description of the Related Art

The achievement of universal interoperability between applications by using Web standards remains the principal goal of Web Services. Web Services use a loosely coupled integration model to allow flexible integration of heterogeneous systems in a variety of domains including business-to-consumer, business-to-business and enterprise application integration. The following basic specifications originally defined the Web Services space: the Simple Object Access Protocol (SOAP), the Web Services Description Language (WSDL), and Universal Description, Discovery, and Integration (UDDI). SOAP defines an XML messaging protocol for basic service interoperability. WSDL introduces a common grammar for describing services. UDDI provides the infrastructure required to publish and discover services in a systematic way. Together, these specifications allow applications to find each other and interact following a loosely coupled, platform-independent model.

Presently, the interaction model that is directly supported by WSDL essentially can be viewed as a stateless model of synchronous or uncorrelated asynchronous interactions. Models for business interactions typically assume sequences of peer-to-peer message exchanges, both synchronous and asynchronous, within stateful, long-running interactions involving two or more parties. Nevertheless, systems integration requires more than the mere ability to conduct simple interactions by using standard protocols. The full potential of Web Services as an integration platform will be achieved only when applications and business processes are able to integrate their complex interactions by using a standard process integration model.

The Business Process Execution Language for Web Services (BPEL4WS) fulfills some aspects of a standard process integration model. The BPEL4WS specification defines a technology for integrating cross-enterprise business processes. By coordinating stateful interactions of loosely coupled services across enterprise boundaries, the BPEL4WS technology provides a means of modeling the interactions between an enterprise and its business partners, suppliers and customers and thus the value chain of the enterprise. More particularly, BPEL4WS defines a notation for specifying business process behavior based on Web Services.

In accordance with the BPEL4WS notation, business processes export and import functionality by using Web Service interfaces exclusively. Business processes can be described in two ways. First, executable business processes model the actual behavior of a participant in a business interaction. Abstract business protocols, by comparison, use process descriptions that specify the mutually visible message exchange behavior of each of the parties involved in the protocol without revealing their internal behavior. In any case, the BPEL4WS specification can be used to model the behavior of both executable and abstract processes.

BPEL4WS provides a language for the formal specification of business processes and business interaction protocols. By doing so, BPEL4WS extends the Web Services interaction model and enables the model to support business transactions. The basic concepts of BPEL4WS can be applied in one of two ways. A BPEL4WS process can define a business protocol role, using the notion of an abstract process. The relationship between two or more business protocol roles can be modeled as a partner link. Similarly, it is also possible to use BPEL4WS to define an executable business process. In an executable business process, the logic and state of the process determine the nature and sequence of the Web Service interactions conducted at each business partner, and thus the interaction protocols.

Importantly, where private implementation aspects of a business process use platform-dependent functionality, which is likely in many if not most realistic cases, the continuity of the basic conceptual model between abstract and executable processes in BPEL4WS makes it possible to export and import the public aspects embodied in business protocols as process or role templates while maintaining the intent and structure of the protocols. This is arguably the most attractive prospect for the use of BPEL4WS from the viewpoint of unlocking the potential of Web Services. Specifically, BPEL4WS allows the development of tools and other technologies that greatly increase the level of automation and thereby lower the cost in establishing cross-enterprise automated business processes.

Notwithstanding, BPEL4WS can be limited to the static deployment of selected business processes. In fact, whereas BPEL4WS provides for a statically specified abstract business protocol for a deployed process, BPEL4WS does not permit the dynamic specification of an abstract business protocol for a deployed process. More concisely, the business process execution environment does not define a process for adapting business protocols or executable business processes as a function of business insights modeled as business policies. The modern, on-demand computing vision, however, demands that the enterprise support a level of business transformation which is informed by timely and relevant business insights. Consequently, comprehensive business transformations require not only the modification of executable business processes, but also the adaptation of partner, supplier and customer interactions modeled by BPEL4WS as business protocols, or abstract processes.

In order to achieve true on-demand computing, there remains an implicit requirement that an enterprise support a level of business transformation which is informed by timely and relevant business insights gained during the execution of a business process. Comprehensive business transformations require not only modification of executable business processes, but also comprehensive business transformations must allow for the adaptation of partner, supplier, and customer interactions modeled as BPEL protocols, or abstract business processes. To that end, potential interaction modalities, such as personal computing clients, paging devices, handheld computing devices and cellular telephones, must be supported so that users can observe and interact with a business process in real-time regardless of the modality. In this way, participants to the business process can react with the greatest amount of efficiency to ever changing conditions in the business process. To date, there is no such method, system or apparatus which can allow for effective communication between business process participants and the underlying technology handling the business process—regardless of the modality of communication.

SUMMARY OF THE INVENTION

The present invention addresses the deficiencies of the art in respect to cross-enterprise business process interaction and provides a novel and non-obvious method, system and apparatus for real-time multi-modal business process transformation interaction in a cross-enterprise business process management system. In accordance with the present invention, a method for real-time multi-modal interaction in a cross-enterprise business process management system can include the steps of handling an event in a business process specification document processing engine and forwarding the event through a gateway interface to a real-time interaction client. A responsive instruction can be received from the real-time interaction client through the gateway interface. In consequence, the execution of a business process transformation script can be triggered based upon the responsive instruction.

In a preferred aspect of the invention, the method also can include registering a real time bot with an event handler coupled to the business process specification document processing engine. The real time bot can be mapped to a business transformation engine configured to perform the triggering step. As such, the forwarding of the event through the gateway interface to a real-time interaction client can be performed in the event handler by routing the event to the registered real time bot.

It is to be understood by the skilled artisan that the invention is not limited strictly to the processing of a single event. Rather, preferably the method of the invention can include further handling additional events in the business process specification document processing engine. As such, gateway interface mappings can be determined for each of the additional events. Once the mappings have been determined, each of the additional events can be routed through a mapped gateway interface to an associated real-time interaction client. Notwithstanding, the routing of events to real-time interaction clients can be limited by one or more established notification policies, each of the policies determining when a mapped event is to be routed to a real-time interaction client;

A cross-enterprise business process management system configured for real-time multi-modal interaction can include a business process specification document processing engine configured to process business process specification documents. Each of the documents can describe a business process having one or more business protocols defined therein. The system also can include a deployment service coupled to the engine and programmed to generate and deploy service instances supporting corresponding ones of the business protocols defined in the business process. The system yet further can include a business transformation engine coupled to the business process specification document processing engine and configured to process transformation scripts for changing the business process by activating and deactivating selected ones of the business protocols in the business process according to registered event personas and business transformation operatives.

Importantly, a real-time bot can be coupled to the business process specification document processing engine. The real-time bot can be configured to provide an event interface between the business transformation engine and at least one user interface modality gateway instance providing an interface for real-time clients to interact with the real time bot to execute selected ones of the transformation scripts. Notably, the real-time clients can include an e-mail client, an instant messaging client, a pager, a voice mail client, and a cellular telephone, to name a few.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for real-time multi-modal business process transformation interaction in a cross-enterprise business process management system. In accordance with the present invention, the business process management system can be adapted to permit the variable modification of a defined business process. In this regard, a defined business process can be re-factored to permit the handling of business process transformation events. Moreover, one or more mappings to the event handlers can be registered as can one or more business transformation operatives configured to specify the activation of specific business activities at particular places within the business process.

Once the defined business process has been re-factored, the business process can be "seeded" with a business process transformation policy. In this regard, the policy can be processed to identify specific conditional correlations with both the registered mappings to the event handlers and also the registered business transformation operatives. The resulting seed can be registered as an instance of a business transformation operative. Subsequently, upon receipt of a business process transformation event, the instance of the business transformation operative can be located and the specific business activities can be activated and the business process can be configured according to the mapped business transformation operatives and through the operation of the event handlers. In this way, the business process can be modified dynamically according to the policy without requiring a complete manual re-tooling of the business process.

An event handler can be disposed in the business process management system and configured to correlate particular business process transformation events with specified real-time interaction clients, including for instance, an e-mail client, an instant messaging client, a pager, a voice mail client, and a cellular telephone, to name a few. Received business process transformation events can be processed in the event handler by forwarding the event through a gateway interface to a correlated real-time interaction client. A responsive instruction can be received from the real-time interaction client through the gateway interface. In consequence, the execution of a business process transformation script can be triggered based upon the responsive instruction. Notably, the forwarding of the event by the event handler can be limited by terms of a notification policy associated with the event.

Figure 1:
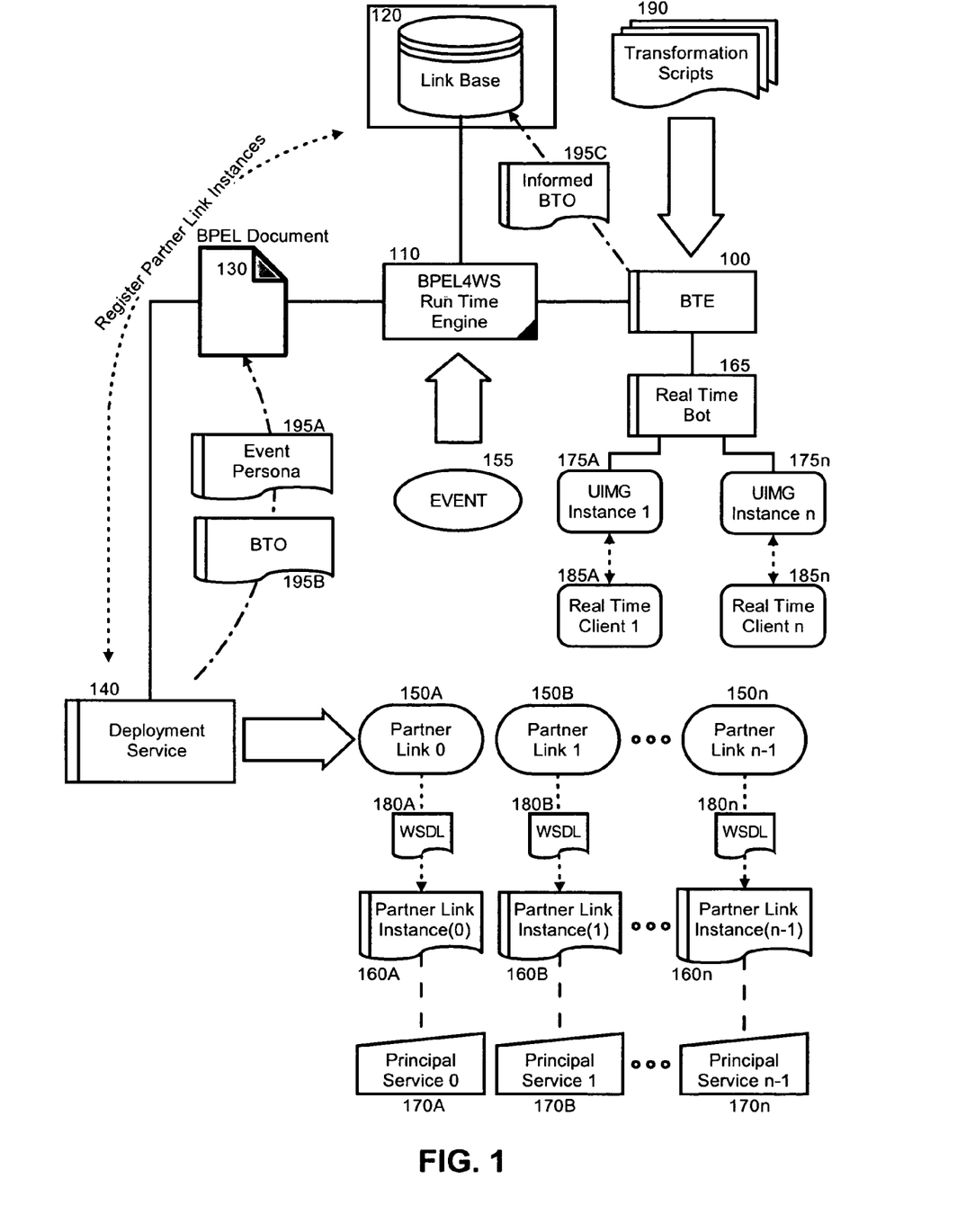
FIG. 1 is a schematic illustration of a cross-enterprise business process interaction system which has been configured for real-time multi-modal business process transformation interaction in accordance with the inventive arrangements.

FIG. 1 is a schematic illustration of a cross-enterprise business process interaction system which has been configured for dynamic business protocol based policy injection in accordance with the inventive arrangements. The system can include a business process specification document processing engine configured to process business process specification documents. Business process specification documents are documents—typically markup language documents—which define the sequence of a business process. Typically associated with Web services, the business process specification documents also include information regarding the location and addressability of Web services programmed to implement activities in the sequence of the business process.

In a preferred aspect of the invention, the business process specification document processing engine can be a business process execution language (BPEL) run-time engine 110. As such, the BPEL run-time engine 110 can be configured to process a BPEL conforming document 130 by deploying Web services to support the activities of the business process defined within the BPEL document 130. In this regard, the BPEL run-time engine 110 can process a sequence of defined activities in the BPEL document 130 to identify a workflow of activities in the BPEL document 130, and also a set of messages responsive to which the BPEL run-time engine 110 can manage the invocation of selected ones of the deployed Web services. As an example, the BPEL run-time engine 110 can be a BPEL run-time engine configured to process BPEL4WS compliant documents.

A deployment service 140 can be coupled to the BPEL run-time engine 110. The deployment service 140 can be configured to re-factor artifacts associated with the BPEL document 130, including for example, the BPEL document 130 itself in addition to corresponding WSDL documents. A link base authority 120 can be communicatively linked to the deployment service 140. The link base authority 120 can be a Web service programmed to manage an XLink link base document. The XLink link base document can serve as a registry for all information related to the business process described in the BPEL document 130. Importantly, the BPEL run-time engine 110 can be configured with an XLink interpreter (not shown) to process xlinks in the link base authority 120.

One or more partner links 150A, 150B, 150n can be defined within the BPEL document 130, each of the partner links 150A, 150B, 150n representing a role in the business process described within the BPEL document 130. For each defined partner link 150A, 150B, 150n, a corresponding partner link instance 160A, 160B, 160n can be created as a Web service along with a WSDL document 180A, 180B, 180n. The partner link instances 160A, 160B, 160n can embody the role of corresponding partner links 150A, 150B, 150n defined within the BPEL document 130. Each of the partner link instances 160A, 160B, 160n further can include a specification of an endpoint address for a principal service 170A, 170B, 170n designated to support the role associated with a corresponding one of the partner links 150A, 150B, 150n.

In accordance with the inventive arrangements, a business transformation engine (BTE) 100 can be coupled to the BPEL run-time engine 110. The BTE 100 can be a Web service extension to the BPEL run-time engine 100. The BTE 100 can be programmed to process transformation scripts 190, each of which can express business insights and business agreements coordinated with business transformation actions. Specifically, each of the scripts 190 can include conditional expressions which trigger actions responsive to the detection of mapped business transformation events. To that end, event handlers can be associated with the conditional expressions during the deployment process of the BPEL document 130.

In operation, when deploying a new business process defined by the BPEL document 130, the deployment service 140 can generate partner link instances 160A, 160B, 160n for each partner link 150A, 150B, 150n defined in-the BPEL document 130. In particular, each of the partner link instances 160A, 160B, 160n can be created based upon a corresponding WSDL document 180A, 180B, 180n provided to the deployment service 140 in association with the BPEL document 130. Notably, each of the partner link instances 160A, 160B, 160n can include a skeletal structure acting as an interface to the underlying ones of the principal services 170A, 170B, 170n. When bound and deployed as a Web service, each of the partner link instances 160A, 160B, 160n thus can act as a proxy for corresponding ones of the principal services 170A, 170B, 170n.

The deployment service 140, having created the partner link instances 160A, 160B, 160n can register each of the partner link instances 160A, 160B, 160n with the link base authority 120. As a result, any one of the partner link instances 160A, 160B, 160n can be notified when an endpoint reference to a corresponding one of the principal services 170A, 170B, 170n has changed. Once the partner link instances 160A, 160B, 160n have been registered with the link base authority 120, the BPEL document 130 and its corresponding WSDL document (not shown) can be re-factored so that the partner link instances 160A, 160B, 160n are utilized in lieu of a direct utilization of the principal services 170A, 170B, 170n. Specifically, the WSDL documents 180A, 180B, 180n for each partner link 150A, 150B, 150n can be modified to point to the newly deployed partner link instances 160A, 160B, 160n.

Within the BPEL document 130 itself, an event handler (not shown) can be included and configured to update the endpoint reference information of the partner link instances 160A, 160B, 160n responsive to the occurrence of specified events. Consequently, the WSDL document (not shown) for the BPEL document 130 can be updated to reflect the presence of the event handler. Once the BPEL document 130 and the companion WSDL document (not shown) have been re-factored, one or more XLinks for the business process can be registered with the link base authority 120. In this regard, each XLink can bind a partner link 150A, 150B, 150n to a principal service 170A, 170B, 170n by way of the partner link instances 160A, 160B, 160n. When complete, the re-factored BPEL document 130 and the companion WSDL document (not shown) can be deployed along with the WSDL documents 180A, 180B, 108n by the BPEL run-time engine 110.

In addition to the event handler configured for updating the endpoint reference, additional event handlers can be generated for each scope in the BPEL document 130 that provides the function of getting or setting each variable in the scope. Moreover, a set of event personas 195A can be registered in the link base authority 120. An event persona 195A can correlate a specific event handler disposed in the BPEL document 130 with a conditional expression associated with the activation of a business transformation. Where multiple events are associated with the same conditional expression, the event persona 195A further can include conflict resolution logic.

One or more business transformation operatives (BTOs) 195B can be registered in the link base authority 120 in reference to supporting particular business transformation actions in the business process defined in the BPEL document 130. Each registered BTO 195B can support a declarative model including its own deployment descriptor which provides the necessary information to support the registration of the BTO 195B. The deployment descriptor of the BTO 195B can include references to all associated BPEL artifacts including both BPEL and WSDL documents along with any relevant endpoint reference based information. The BTO 195B also can include information regarding the prospective location within a deployed business process represented as an XLink reference to an immersed activity.

In the present invention, the transformation of a business process can be defined according to a specified policy. To that end, transformation scripts 190 can define sub-expressions correlating conditional expressions to actionable expressions. The BTE 100 can map the conditional expressions in the transformation scripts 190 to a registered event persona 195A. Similarly, the BTE 100 can map the actionable expressions to a registered BTO 195B. Where the sub-expressions can be resolved by the BTE 100, an "informed" BTO 195C can be registered as an instance of the sub-expression for use during the triggering of a transformation event 155.

Specifically, when a business process transformation event 155 is received in the BPEL run-time engine 110, the event can be correlated to the informed BTO 195C. Once the event can be matched to the informed BTO 195C, the event persona 195A associated with the informed BTO 195C can be retrieved and processed to locate and activate a suitable event handler. Similarly, the registered BTO 195B can be retrieved and processed to identify the relevant portion of the BPEL document 130 in which an immersed activity is to be placed and activated in order to transform the business process.

In accordance with the present invention, a real-time bot 165 can be coupled to the BTE 100. The real-time bot 165 can provide a generic interface to the BTE 100 for coupled user interface modality instances 175A, 175n. Each of the user interface modality instances 175A, 175n can provide an interface to one or more real-time interaction clients 185A, 185n. The real-time interaction clients 185A, 185n can provide an interface for an end-user to interact with the business process using real-time communicative clients as voice-enabled telephones and cellular telephones, instant messaging clients, text messaging clients, voice mail clients, e-mail clients, pagers and the like. Importantly, like the BPEL run-time engine 110, the real-time bot 165 can be a Web service through which an event handler disposed in or coupled to the BPEL run-time engine 110 can route received events accordingly.

Figure 2:
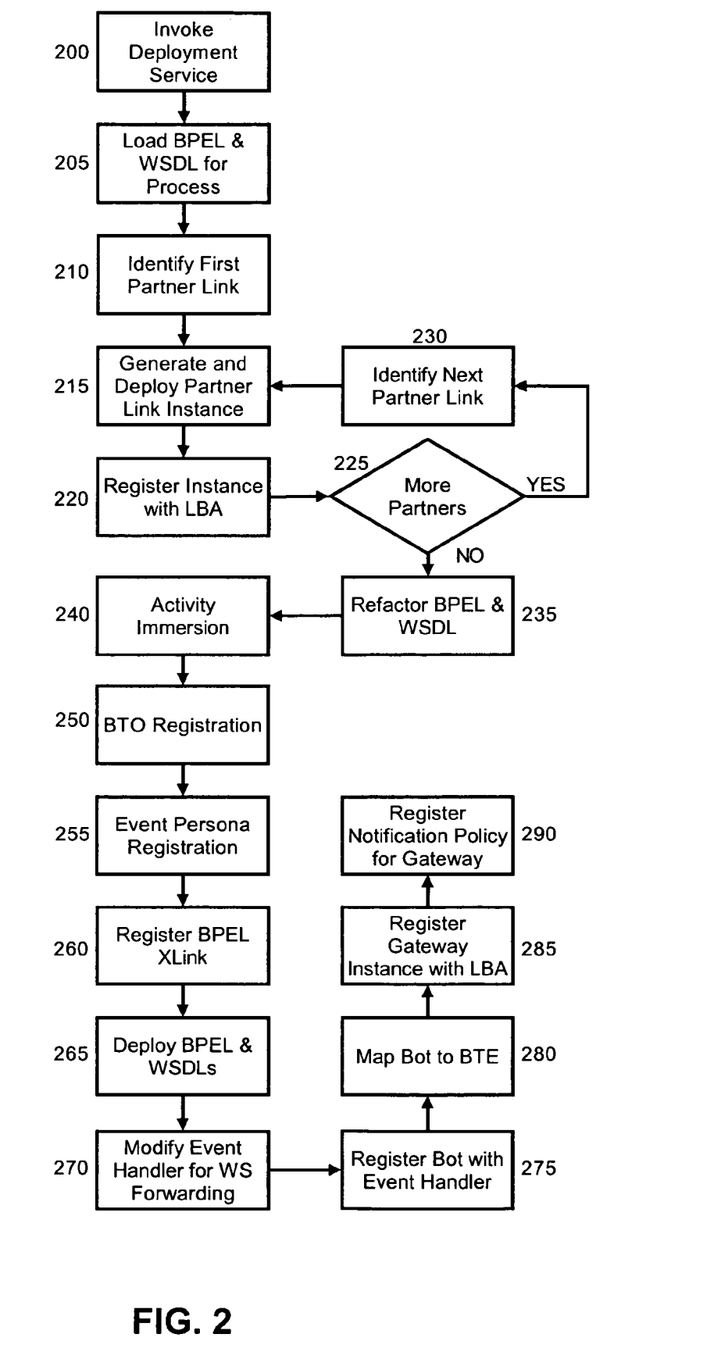
FIG. 2 is a flow chart illustrating a process for deploying partner link services in the system of FIG. 1 to support real-time multi-modal business process transformation interaction.

Turning now to FIG. 2, a flow chart is shown which illustrates a process for enabling multi-modal real-time interaction during the process of deploying partner link services in the system of FIG. 1. Beginning in block 200, the deployment service can be invoked. Specifically, the deployment service can be invoked by calling the deploy operation of the BPEL run-time engine and by passing a BPEL document and a companion WSDL document to the deployment service.

Additionally, the WSDL documents for the partner links specified in the BPEL document further can be passed to the deployment service.

In block 205, the BPEL document and companion WSDL document can be loaded for processing. In block 210, a first partner link can be identified in the BPEL document. In block 215, a partner link instance can be generated and deployed for the first partner link. Specifically, the WSDL document for the identified partner link can be used to generate a skeleton and a service that reflects the actual interface of a corresponding principal service. The partner link instance can be bound and deployed as a Web service which acts as a proxy for the principal service. An exemplary WSDL fragment follows:

```
<wsdl:service name = "MyPTService">
    <wsdl:port binding="namespace:MyServiceSoapBinding"
    name="MyService">
        <wsdlsoap:address location="http://localhost:8080/appserver/
        MyAuxService"/>
    </wsdl:port>
</wsdl:service>
```

In block 220, the partner link instance can be registered with the link base authority. An exemplary XLink fragment follows:

```
<baseResource id="PRIMARY_SERVICE_AUX"
xlink:type="extended">
    <baseResourceRef xlink:type="locator"
    xlink:href=http://mycompany.com/primary_service_aux
    xlink:role="PARTNER_LINK_INSTANCE"
    xlink:label="PRIMARY_SERVICE_AUX" />
</baseResource>
```

In particular, the registration of the partner link instance can result in the notification of the partner link instance when its associated endpoint reference to a supporting principal service has changed. In blocks 225 and 230, the process of generating and deploying partner link instances for identified partner links, and also of registering the partner link instances with the link base authority can repeat for each identified partner link in the BPEL document. Subsequently, the process can continue in block 235 through block 265.

Figure 3:
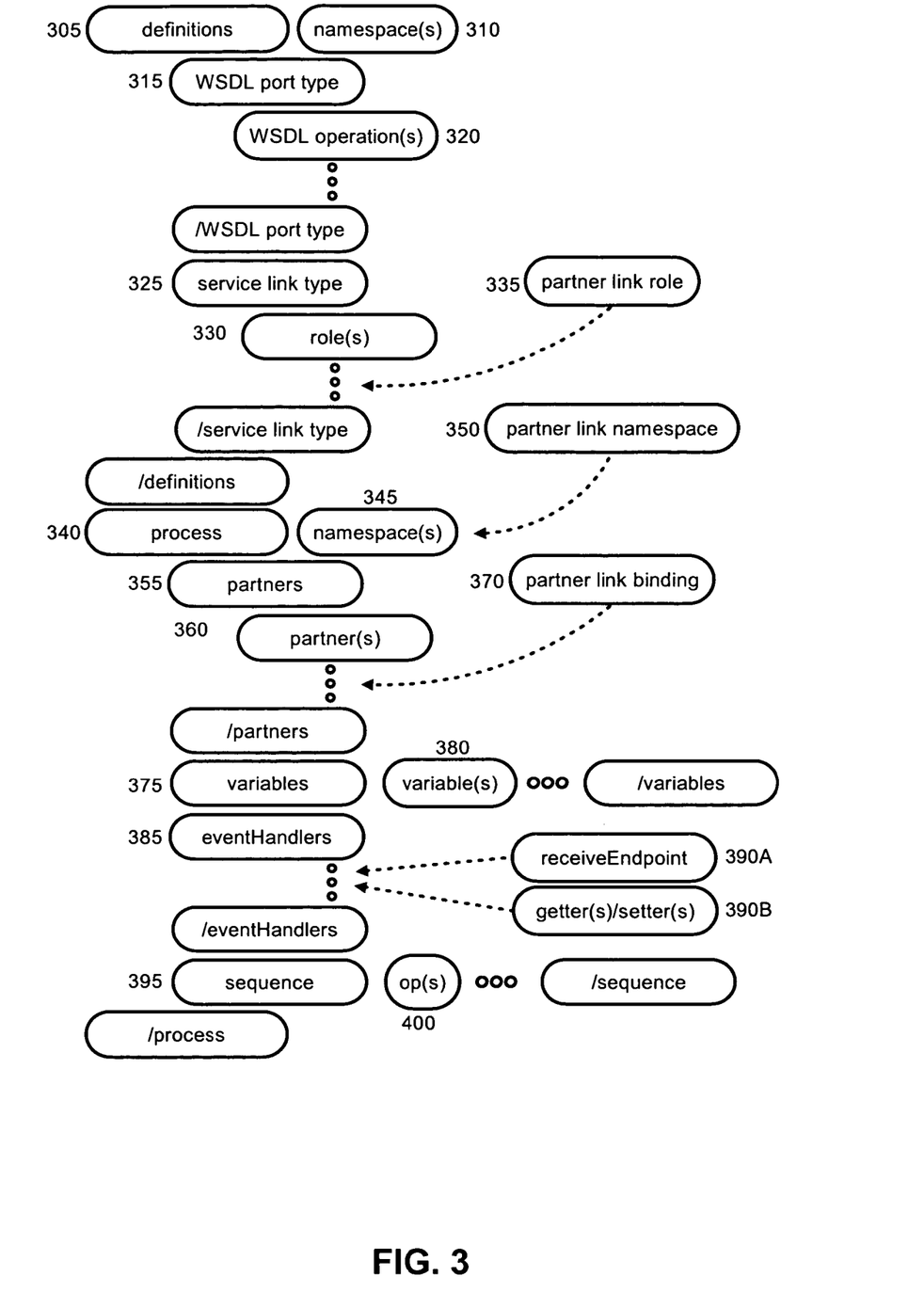
FIG. 3 is a block diagram of a BPEL document configured for modification according to the deployment process of FIG. 2.

In particular, in block 235 the BPEL document and the WSDL document for the business process can be re-factored. More particularly, each partner link specified in the BPEL document can be changed to reflect a correspondence to the partner link instance created and deployed in block 215. Also, event handlers can be established for each scope in the BPEL document that provide the function of getting or setting each variable in the scope. In more particular illustration, FIG. 3 is a block diagram of a BPEL document configured for modification according to the deployment process of FIG. 2. The BPEL document illustrated in FIG. 3 can include a definitions portion 305 in which a namespace 310 can be defined, a WSDL port type 315 having one or more defined WSDL operations 320 can be defined, and a service link type 325 having one or more roles 330 can be defined.

Notably, a process portion 340 can be included in the BPEL document. The process portion 340 can specify one or more namespaces 345 and can incorporate a partners section 355 having one or more defined partner links 360, a variables 375 section having one or more defined variables 380, and a sequence section 395 having one or more operations 400 defined therein. During the re-factoring process of the present invention, a reference to partner link instance 335 can be added to the BPEL document as can a partner link instance namespace definition 350 for the namespace of the partner link instance 335. A binding 370 to the WSDL document for the partner link instance 335 further can be added to the partners section 355 of the BPEL document. Finally, an event handling section 385 can be added in which an event 390A can be defined for handling a change in reference endpoint to a principal service.

Importantly, the event handling section 385 also can be augmented to include one or more getter/setter event handlers 390B for each scope in the BPEL document that provides either or both of a getting or setting function for each variable in the scope. The establishment of the getter/setter event handlers 390B can allow business protocols added at a specific point in the original business protocol flow to get and set variable values outside of its own document. For any new business protocol that may be added at a specific point in the original business protocol, the protocol can contain variable declarations for any scoped variable in the context of the original business protocol that are initialized and returned via the generated event handlers.

Returning now to FIG. 2, in block 240 an activity immersion step can include the conversion of every BPEL activity to an un-actuated XLink. The un-actuated XLink can serve as a means to provide extensions to the business protocol. The XLink can have a specific role that represents it as a business transformation link. Each link can be registered with the link base authority and each link can have a status describing how to act responsive to actuation. For example, the link can reference a third party arc in the link base, but that arc may be followed either before or after the execution of the current activity or both. An exemplary immersion of a BPEL activity can produce the following link:

```
<invoke partner="primary_supplier"
portType="namespace:supplierSLT"
operation="receivePurchaseOrder"
inputVariable="purchaseOrder"
outputVariable="invoice"
xlink:type="simple"
xlink:role=http://mycompany.com/bizXformLink
xlink:href=http://linkbaseAuthority/linkBaseAuthority
xlink:actuate="other"
status="activity.pre"|"activity.post"|"activity.both"
xlink:arcrole=http://www.w3.org/xlink/properties/linkbase/
/>
```

In block 250, each BTO can be registered with the link base authority. Additionally, in block 255 each event persona can be registered with the link base authority. In block 260, the XLinks for the business process defined in the BPEL document can be registered with the link base authority. In this regard, an XLink stored in the link base authority can bind the partner link role to the principal service along with the partner link instance to a partner link. If a partner link is mapped to a new principal service, then the partner link instance that is mapped to a specific partner link can be updated with a new endpoint address. Finally, in block 265 the re-factored BPEL document and the re-factored WSDL document can be deployed for use by the BPEL run-time engine.

In block 270, specified ones of the event handlers can be modified to support the forwarding of event messages to Web services. Subsequently, in block 275, a real-time bot, in the form of a Web service, can be registered with at least one of the event handlers so that events processed in the event handlers can pass the events to the real-time bot. In block 280, the real-time bot can be registered with the BTE. In this regard, the end-point reference to the BTE can be provided to the real-time bot so that the real-time bot can interact with the BTE. In block 285, gateway interface instances can be mapped to particular events. To that end, the mappings can be written to the link base authority. Finally, in block 290 at least one notification policy can be mapped to a specified event. Specifically, the notification policy can indicate when a particular event is to be routed to a particular modality based upon the event.

Figure 4:
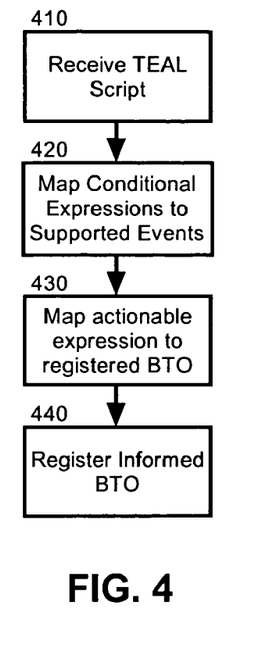
FIG. 4 is a flow chart illustrating a process for policy seeding the system of FIG. 1 to support dynamic business protocol based policy injection responsive to a business transformation.

Turning now to FIG. 4, a multi step process can be defined for the insertion of a policy injection process relative to business transformation scripts allowing for the dynamic transformation of a business protocol. In more particular illustration, FIG. 4 is a flow chart illustrating a process for policy seeding the system of FIG. 1 to support dynamic business protocol based policy injection responsive to a business transformation. Beginning in block 210 a transformation script can be received as input into the BTE. An exemplary transformation script can include one or more conditional expressions in the form of "If [conditional_expression] then [actionable_expression]".

In block 420, each conditional expression specified in the transformation script can be mapped to an event persona. Specifically, when an event persona first is registered with the link base authority, the event persona can be correlated to one or more sub-expressions. Thus, when processing a transformation script, the BTE can search the set of registered event persona in the link base authority to locate a specific event persona instance that claims a correlation with a conditional expression identified in the transformation script. If no suitable event persona instance can be located for the conditional expression, the BTE can reject the transformation script.

In block 430, each actionable expression in the transformation script can be mapped to a registered BTO. Similar to the event persona instance, each BTO can be registered in association with a corresponding set of actionable expressions. Consequently, when processing a transformation script, the BTE can search the set of registered BTOs in the link base authority to locate a BTO corresponding to the conditional expression. Finally, in step 440, once the BTE has located an event persona instance and a BTO for the conditional expression, the BTE can register an informed BTO with the link base authority. The informed BTO can represent an instance of the transformation scxript.

Figure 5:
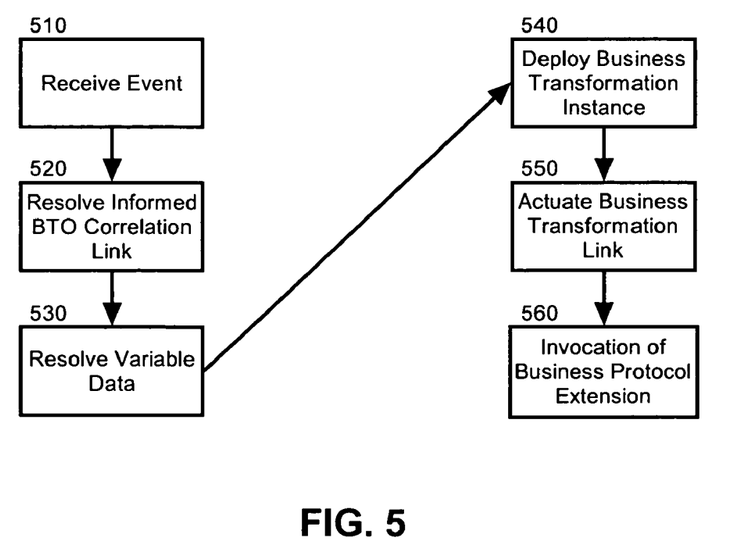
FIG. 5 is a flow chart illustrating a process for changing a business protocol responsive to a business transformation; and, FIG. 6 is a flow chart illustrating a process for real-time multi-modal business process transformation interaction.

Once the informed BTO has been registered, events can trigger the informed BTO to change the business protocol. In further illustration, FIG. 5 is a flow chart illustrating a process for changing a business protocol responsive to a business transformation. Beginning in block 510, an event can be received that represents a registered event persona. In block 520, a registered informed BTO can be correlated to the received event. Subsequently, in block 530 variable data within the scope of the insertion of the BTO instance can be inserted and resolved. Specifically, the insertion and resolution can include inserting all variable definitions in the parent BPEL document that are in scope, and initializing these values using the getter event handlers generated when deploying the parent BPEL. Upon termination of execution, the child BPEL represented by the informed BTO can set its parent variable values using the appropriate setter event handlers.

In block 540 the business transformation instance can be deployed. In particular, once the BTE locates an informed BTO which correlates to a received event, the informed BTO can be interpreted to trigger the deployment of a BPEL sub process described in the BTO. Notably, the BTO can include information relative to its insertion point in the business protocol. As such, the information can translate into a specific business transformation link within a specific business protocol. This link can be actuated in block 550. Finally, in block 560 upon actuation of the business transformation link, the invocation of the business protocol extension can be enabled through an XLink reference.

Figure 6:
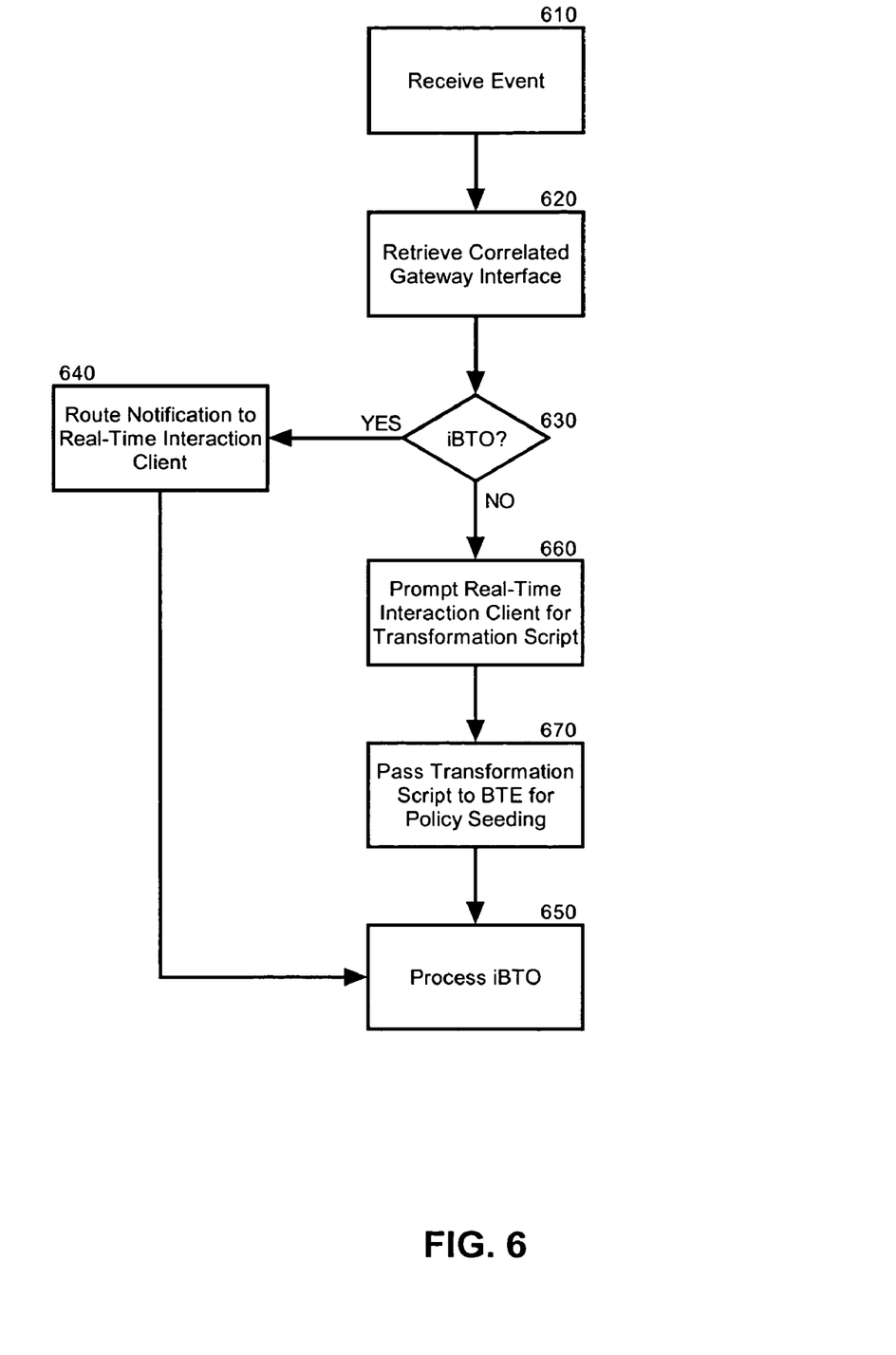

Turning now to FIG. 6, a flow chart is shown which illustrates a process for real-time multi-modal business process transformation interaction in the system of FIG. 1. Beginning in block 610, an event can be received. In block 620, a gateway interface instance can be correlated to the event to determine which among the user interface modality gateway interface instances should receive notification of the event. For instance, depending upon the severity of the event, different modalities can be chosen—instant messaging or voice messaging for severe, time-critical events, and e-mail for less severe events.

In decision block 630, it can be determined if an association already exists between an automated responsive action and the event in the form of an informed BTO. If so, in block 640 a notification of the event can be routed to the correlated user interface modality gateway interface instance if permitted by a notification policy, and in block 650 the informed BTO associated with the event can be processed by regenerating the event for normal processing in the BTE. Otherwise, in block 660 the event can be routed to the correlated user interface modality gateway interface instance in the form of a prompt for an association to a transformation script. In response, in block 670 an association to a transformation script can be returned which can be passed to the BTE for policy seeding in an informed BTO. Subsequently, in block 650 the informed BTO can be processed by regenerating the event for normal processing in the BTE.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A computer-implemented method for real-time multi-modal interaction in a cross-enterprise business process management system, the method comprising the steps of:

handling an event in a business process specification document processing engine; forwarding said event through a gateway interface to a real-time interaction client; receiving a responsive instruction from said real-time interaction client through said gateway interface;

triggering the execution of a business process transformation script based upon said responsive instruction;

registering a real time bot with an event handler coupled to said business process specification document processing engine;

mapping said real time bot to a business transformation engine configured to perform said triggering step; and, performing said forwarding step in said event handler by routing said event to said registered real time bot.

2. The method of claim 1, further comprising the steps of:

further handling additional events in said business process specification document processing engine;

determining gateway interface mappings for each of said additional events; and, routing each of said additional events through a mapped gateway interface to an associated real-time interaction client.

3. The method of claim 2, further comprising the step of registering a plurality of gateway interface instances to corresponding specified events to form said gateway interface mappings.

4. The method of claim 2, further comprising the steps of:

establishing a set of notification policies, each of said policies determining when a mapped event is to be routed to a real-time interaction client;

mapping selected events to corresponding notification policies in said set; and, performing said routing step for each of said additional events only based upon a mapped one of said notification policies.

5. In a computer system having at least one processor, a cross-enterprise business process management system configured for real-time multi-modal interaction comprising:

a business process specification document processing engine configured to process business process specification documents, each of said documents describing a business process having a plurality of business protocols defined therein;

a deployment service coupled to said engine and programmed to generate and deploy service instances supporting corresponding ones of said business protocols defined in said business process;

a business transformation engine coupled to said business process specification document processing engine and configured to process transformation scripts for changing said business process by activating and deactivating selected ones of said business protocols in said business process according to registered event personas and business transformation operatives;

a real time bot coupled to said business process specification document processing engine and configured to provide an event interface between said business transformation engine and at least one user interface modality gateway instance providing an interface for real-time clients to interact with said real time bot to execute selected ones of said transformation scripts; and an event handler coupled to said business process specification document processing engine and programmed to route mapped events to selected ones of said user interface modality gateway instances via said real time bot.

6. The system of claim 5, wherein said real-time clients comprise at least one client selected from the group consisting of an e-mail client, an instant messaging client, a text messaging client, a pager, a voice mail client, and a cellular telephone.

7. The system of claim 5, further comprising a link base authority comprising mappings between events and user interface modality gateway instances.

8. The system of claim 5, further comprising at least one notification policy specifying whether to route an event to a particular one of said user interface modality gateway instances.

9. The system of claim 8, wherein said at least one notification policy is disposed in an informed business transformation operative.

10. A machine readable storage having stored thereon a computer program for real-time multi-modal interaction in a cross-enterprise business process management system, the computer program comprising a routine set of instructions which when executed by a machine cause the machine to perform the steps of:

handling an event in a business process specification document processing engine; forwarding said event through a gateway interface to a real-time interaction client;

receiving a responsive instruction from said real-time interaction client through said gateway interface;

triggering the execution of a business process transformation script based upon said responsive instruction;

registering a real time bot with an event handler coupled to said business process specification document processing engine;

mapping said real time bot to a business transformation engine configured to perform said triggering step; and, performing said forwarding step in said event handler by routing said event to said registered real time bot.

11. The machine readable storage of claim 10, further comprising a routine set of instructions for causing the machine to further perform the steps of:

further handling additional events in said business process specification document processing engine;

determining gateway interface mappings for each of said additional events; and, routing each of said additional events through a mapped gateway interface to an associated real-time interaction client.

12. The machine readable storage of claim 11, further comprising a routine set of instructions for causing the machine to further perform the step of registering a plurality of gateway interface instances to corresponding specified events to form said gateway interface mappings.

13. The machine readable storage of claim 11, further comprising a routine set of instructions for causing the machine to further perform the steps of:

establishing a set of notification policies, each of said policies determining when a mapped event is to be routed to a real-time interaction client;

mapping selected events to corresponding notification policies in said set; and, performing said routing step for each of said additional events only based upon a mapped one of said notification policies.

\* \* \* \* \*